Figure 1A:
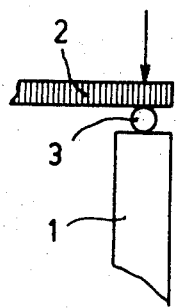

United States Patent [19]
Klomp et al.

[11] 3,865,567
[45] Feb. 11, 1975

[54] METHOD OF SEALING A METAL ARTICLE TO A GLASS OR CERAMIC ARTICLE IN A VACUUM-TIGHT MANNER

[75] Inventors: Johannes Theodorus Klomp; Adrianus Johannes Cornelis Van De Ven, both of Emmasingle, Eindhoven, Netherlands

[73] Assignee: U.S. Philips Corporation, Inc., New York, N.Y.

[22] Filed: July 12, 1973

[21] Appl. No.: 378,591

[30] Foreign Application Priority Data
July 20, 1972 Netherlands.......................... 10011

[52] U.S. Cl.......................................... 65/43, 65/59
[51] Int. Cl.............................................. C03c 27/04

[58] Field of Search.................................. 65/43, 59

[56] References Cited
UNITED STATES PATENTS
2,094,287  9/1937  Zimmerman et al. ............... 65/43 X
2,876,596  3/1959  Kessler, Jr. ............................. 65/59

Primary Examiner—Arthur D. Kellogg
Attorney, Agent, or Firm—Frank R. Trifari; George B. Berka

[57] ABSTRACT

A method of sealing articles in a vacuum-tight manner by using a sealing body having a circular cross-section and consisting of lead or aluminum or an alloy of one of these metals. A pressure is exerted at the sealing temperature in such a manner that the sealing body undergoes a quick and strong plastic deformation.

5 Claims, 2 Drawing Figures

METHOD OF SEALING A METAL ARTICLE TO A GLASS OR CERAMIC ARTICLE IN A VACUUM-TIGHT MANNER

The invention relates to a method of sealing articles in a vacuum-tight manner wherein at least the welding surfaces to be sealed consist of glass, ceramic material or metal while using a sealing body which is plastically deformed when the joint is established.

Different methods of sealing articles consisting of metal and glass or of metal and ceramic material in a vacuum-tight manner have been described. Such a method is described, for example, in Dutch Pat. Application No. 6906150. In the latter method the welding surfaces of the metal and glass articles to be sealed are pressed together and the assembly is heated at a temperature which is lower than the softening point of the glass and which lies between a temperature at which the vapour pressure of the metal is equal to $10^{-10}$ Torr and the melting point of the metal.

U.S. Pat. No. 2,876,596 describes a method of establishing a vacuum-tight joint between two parts one of which consists of glass, in which an aluminum foil is provided as a sealing body between the parts to be sealed, the assembly being brought to the sealing temperature which lies below the melting point of aluminum and the softening point of the glass which constitutes one of the parts whereafter the parts to be sealed are pressed together at a pressure of approximately 200–500 kg/sq.cm. It has been noted that in this method the pressure used must be higher than the yield strength of the aluminum so that it starts to flow and breaks the oxide film on the surface of the aluminium.

German Offenlegungsschrift No. 2,109,902 describes a method in which parts consisting of glass and metal are sealed in a vacuum-tight manner and in which a flat ring of aluminum is provided as a sealing body between the parts to be sealed. A pressure of several hundred kg/sq.cm is exerted on the parts and while maintaining this pressure the assembly is heated to the sealing temperature. During the heat treatment to the actual sealing temperature the flat aluminium ring is deformed to an increasing extent. The Offenlegungsschrift states that it is assumed that due to the continuing deformation during the heat treatment the quantity of oxide forming on the aluminium ring remains small so that always a fresh metal surface is provided on the glass due to the deformation.

During investigation of the known above-described methods of Applicant found that satisfactory results were not always obtained. In many cases joints were obtained which did not remain vacuum-tight in the long run. The Applicant believes that this is to be ascribed to the fact that, to a considerable extent, no direct joint between glass, aluminium and metal is obtained by these known methods. Aluminium oxide is present as an intermediate layer in a considerable part of the sealing surface.

The invention relates to a method in which the drawbacks of the known above-described methods are obviated. When using the method according to the invention, vacuum-tight joints are obtained which also remain vacuum-tight in the long run.

The Applicant has found that such satisfactory joints can be obtained, for example, by using an article of aluminium if this article is quickly deformed plastically to a great extent during the stage of the method when the joint is established.

These two conditions: (a) a quick and (b) a plastic deformation to a great extent are not or insufficiently fulfilled by the known methods.

The invention relates to a method of sealing articles in a vacuum-tight manner wherein at least the surfaces to be sealed consist of glass, ceramic material or metal and wherein a sealing body comprising a metal of the group consisting of aluminium, aluminium alloy, lead and lead alloy is provided between these surfaces, the assembly of the articles to be sealed or at least their surfaces to be sealed and the sealing body being heated at the temperature at which the joint is established, i.e., the sealing temperature, which temperature lies below the softening point of the glass or the ceramic material or the melting point of the metal of the articles to be sealed and below the melting point of the metal constituting the sealing body, the articles to be sealed being pressed together at the sealing temperature and is characterized in that the sealing body has a circular or substantially circular cross-section and that the pressure at which the articles is be sealed at the sealing temperature are pressed together is such that a quick and strong plastic deformation of the sealing body is effected.

During heating the assembly of the articles to be sealed and the sealing body to the sealing temperature the articles may be kept in position by means of pressure. This pressure must not, however, be so high that the sealing body is deformed.

In the method according to the invention a sealing body consisting of aluminium or lead is preferably used.

It may be advantageous to ensure that the sealing body has at most an oxide film which is as thin as possible. In this connection it is to be noted that the assembly of the articles to be sealed and the sealing body may be placed in an evacuated space.

Furthermore it is to be noted that it is substantially impossible in practice to obtain a sealing body of aluminium or lead which is free from an oxide film. The method according to the invention makes it eminently possible to use a sealing body having an oxide film because in the method a quick and strong plastic deformation of the sealing body is effected; as a result a direct sealing between glass and metal or ceramic material and metal is obtained to a great extent in the established joint. This is important because an intermediate layer consisting of metal oxide affects the vacuum-tightness of the joint.

When using a sealing body of aluminium the sealing temperature may be chosen to be between approximately 570° and approximately 660°C and preferably approximately 620°C. When using a sealing body of lead the sealing temperature may be chosen to be between approximately 250° and approximately 320°C and preferably approximately 290°C.

The sealing temperature may be chosen to be lower as the pressure to be used is higher.

The pressure to be used on a sealing body of aluminium is between approximately 70 and approximately 180 kg/sq./cm and on a sealing body of lead it is between approximately 80 and 140 kg/sq./cm.

These pressures are calculated on the boundary surface (sealing surface) between the deformed sealing body and one of the parts to be sealed.

In the method according to the invention in which the plastic deformation of the sealing body is to be effected quickly, the pressure by which an effective deformation is realized will generally be exerted within fewer than 5 seconds and preferably within fewer than 2 seconds.

The method according to the invention may be used advantageously inter alia for sealing the face plate and the cone of a television display tube. The method makes it possible to use a flat face plate. Preferably, a sealing body of lead is used in this case.

Furthermore the method according to the invention may be used, for example, for the vacuum-tight connection of a fibre-optics face plate to a metal holder in the manufacture of an X-ray image intensifier tube and for the vacuum-tight provision of face plates, for example, fibreoptics face plates in television camera tubes. In these cases a sealing body of lead is preferably used.

Another use of the method according to the invention is the one in which a holder of aluminium is sealed to an isolator consisting of steatite while using a sealing body of aluminium in the manufacture of electrolytic capacitors.

In the drawing FIG. 1a is a diagrammatical cross-section of part of the metal holder 1 of an X-ray image intensifier tube to which a fibre-optical face plate 2 is to be sealed in a vacuum-tight manner while using the method according to the invention. In the Figure, 3 denotes parts of the ring of lead (diameter 4 mms) with the aid of which the vacuum-tight joint is to be established.

Figure 1B:
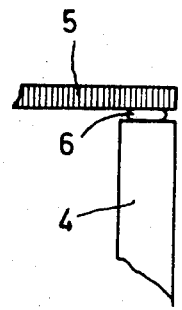

The joint was established while using the method according to the invention. The assembly was heated to 290°C and at this temperature a pressure was exerted in the direction of the arrow in FIG. 1a so that the desired quick and strong plastic deformation of the ring 3 was effected in fewer than 2 seconds. The result is shown diagrammatically in FIG. 1b for the part corresponding to the part of the assembly shown in FIG. 1a. In FIG. 1b, 4 denotes the metal holder of the X-ray image intensifier tube, 5 denotes the fibre-optical face plate and 6 denotes the deformed ring of lead.

What is claimed is:

1. A method of sealing articles in a vacuum-tight manner wherein at least the surfaces to be sealed consist of at least one of glass, ceramic, and metal, comprising the steps of:
   a. providing between said surfaces a sealing body having a substantially circular cross-section and comprising a metal of the group consisting essentially of aluminum, aluminum alloy, lead, and lead alloy;
   b. heating at least said surfaces and sealing body to an elevated sealing temperature that is below the softening point of said glass, the softening point of said ceramic material, and
   c. pressing said articles together at said sealing temperature and at a pressure and loading rate that provides plastic deformation of said sealing body, and a joint thereof to the surfaces to be sealed prior to the re-formation of oxide films on the deformed surface portions of said sealing body.

2. A method as claimed in claim 1, wherein said sealing body consists essentially of lead and said sealing temperature is between approximately 250° and approximately 320°C.

3. A method as claimed in claim 1, wherein said sealing body consists essentially of aluminum.

4. A method as claimed in claim 1, wherein said pressure is applied at said sealing temperature to effect plastic deformation of said sealing body in less than 2 seconds.

5. A method as claimed in claim 4, wherein said pressure is between about 70 and about 180 kg./cm² when said sealing body is aluminum and between about 80 and about 140kg./cm² when said sealing body is lead.

* * * * *

PO-1050
(5/69)

UNITED STATES PATENT OFFICE
CERTIFICATE OF CORRECTION

Patent No. 3,865,567                    Dated February 11, 1975

Inventor(s)  JOHANNES T. KLOMP ET AL

It is certified that error appears in the above-identified patent and that said Letters Patent are hereby corrected as shown below:

Section [30] on the title page, change "10011"

to --7210011--.

Signed and sealed this 15th day of April 1975.

(SEAL)
Attest:

RUTH C. MASON
Attesting Officer

C. MARSHALL DANN
Commissioner of Patents
and Trademarks